(12) United States Patent
Pawar et al.

(10) Patent No.: US 10,616,801 B1
(45) Date of Patent: Apr. 7, 2020

(54) SYSTEMS AND METHODS FOR DYNAMIC INTER BAND CARRIER AGGREGATION

(71) Applicant: Sprint Spectrum LP, Overland Park, KS (US)

(72) Inventors: Hemanth Pawar, Brambleton, VA (US); Krishna Sitaram, Chantilly, VA (US); Shilpa Kowdley Srinivas, Brambleton, VA (US)

(73) Assignee: Sprint Spectrum L.P., Overland Park, KS (US)

(*) Notice: Subject to any disclaimer, the term of this patent is extended or adjusted under 35 U.S.C. 154(b) by 60 days.

(21) Appl. No.: 15/996,947

(22) Filed: Jun. 4, 2018

(51) Int. Cl.
*H04W 28/06* (2009.01)
*H04L 1/00* (2006.01)
*H04W 72/04* (2009.01)
*H04L 5/00* (2006.01)

(52) U.S. Cl.
CPC ......... *H04W 28/065* (2013.01); *H04L 1/0003* (2013.01); *H04W 72/0453* (2013.01); *H04L 5/001* (2013.01)

(58) Field of Classification Search
CPC ............ H04W 28/065; H04W 72/0453; H04L 1/0003
See application file for complete search history.

(56) References Cited

U.S. PATENT DOCUMENTS

| | | | |
|---|---|---|---|
| 9,300,587 B1* | 3/2016 | Hassan | H04L 47/125 |
| 9,615,245 B2 | 4/2017 | Liang | |
| 9,693,312 B2 | 6/2017 | Roessel et al. | |
| 2007/0030841 A1* | 2/2007 | Lee | G01S 5/0027 370/352 |
| 2010/0027502 A1* | 2/2010 | Chen | H04L 5/0007 370/330 |
| 2010/0190509 A1* | 7/2010 | Davis | H04W 56/006 455/456.1 |
| 2011/0199985 A1* | 8/2011 | Cai | H04L 5/0073 370/329 |
| 2012/0044922 A1* | 2/2012 | Ishii | H04L 5/001 370/338 |
| 2012/0082115 A1* | 4/2012 | Puthenpura | H04W 28/20 370/329 |
| 2012/0122477 A1* | 5/2012 | Sadek | H04W 16/14 455/456.1 |
| 2013/0077554 A1* | 3/2013 | Gauvreau | H04L 5/001 370/312 |
| 2013/0114508 A1* | 5/2013 | Liang | H04L 5/001 370/328 |

(Continued)

*Primary Examiner* — Jael M Ulysse

(57) ABSTRACT

A system for inter band carrier aggregation includes an access node configured to deploy a radio air interface to provide wireless services to a plurality of wireless devices. The access node includes a processor configured to determine a location of a wireless device. The processor is also configured to compare the location of the wireless device with predetermined map data to determine whether the wireless device is located within an overlapping area between a first coverage area of a first modulation scheme on a first frequency band and a second coverage area of a second modulation scheme on a second frequency band. The processor is further configured to, when the wireless device is located within the overlapping area, perform an inter band carrier aggregation between the first frequency band and the second frequency band for the wireless device.

20 Claims, 7 Drawing Sheets

(56) References Cited

U.S. PATENT DOCUMENTS

| | | | |
|---|---|---|---|
| 2014/0192732 A1* | 7/2014 | Chen | H04L 1/0026 370/329 |
| 2014/0269877 A1* | 9/2014 | Garcia | H04W 24/08 375/228 |
| 2015/0308838 A1* | 10/2015 | Mishra | G01C 21/32 701/519 |
| 2015/0365946 A1* | 12/2015 | Luong | H04W 72/0453 370/329 |
| 2016/0014613 A1* | 1/2016 | Ponnampalam | H04W 16/18 370/254 |
| 2017/0273128 A1* | 9/2017 | Abedini | H04J 13/0062 |
| 2018/0132269 A1* | 5/2018 | Wang | H04L 5/0055 |
| 2018/0332537 A1* | 11/2018 | Krishnamoorthy | H04W 52/0248 |

* cited by examiner

SYSTEMS AND METHODS FOR DYNAMIC INTER BAND CARRIER AGGREGATION

TECHNICAL BACKGROUND

A wireless network, such as a cellular network, can include an access node (e.g., base station) serving a number of wireless devices or user equipment (UE) in a geographical area covered by a radio frequency transmission provided by the access node. Data may be communicated between the access node and the wireless devices on a plurality of frequency bands. A frequency band may be composed of one or more frequency sub-bands or component carriers each having a certain bandwidth (e.g., 1.4 MHz, 3 MHz, 5 MHz, 10 MHz, 15 MHz, 20 MHz, or other suitable bandwidths). A wireless device may be configured to receive or transmit data on one or more component carriers of the frequency band. To increase bandwidth and data transmission rate, wireless networks may implement carrier aggregation to aggregate two or more component carriers from different frequency bands (i.e., inter band carrier aggregation) or from the same band (i.e., intra band carrier aggregation). Carrier aggregation can increase the bandwidths and transmission rates.

When multiple frequency bands are used in a wireless network, each frequency band has a coverage area. In generally, lower frequency bands have larger coverage areas that can reach wireless devices at further distances from the access node. Higher frequency bands have smaller coverage areas that can reach wireless devices at shorter distances from the access node.

The wireless network may support a plurality of modulation schemes, such as Quadrature Phase Shift Keying (QPSK), and Quadrature Amplitude Modulation (QAM). QPSK enables data to be transmitted at 2 bits per symbol with one of four possible carrier phase shifts (0, 90, 180, or 270 degrees). QAM combines two amplitude-modulated carrier waves into a single channel, thereby doubling the effective bandwidth. Various forms of QAM may be used, including, for example, 4 QAM, 16 QAM, 64 QAM, and 256 QAM. The numbers 4, 16, 64, and 256 indicate the numbers of points used in a constellation diagram for the QAM, as known in the art. The higher the number, the higher the order of modulation, and the higher the data transmission rate (e.g., more bits per symbol). For example, 4 QAM enables a data transmission rate of 2 bits per symbol, which is equivalent to the data rate of QPSK, 16 QAM enables a data transmission rate of 4 bits per symbol, and 64 QAM enables a data transmission rate of 6 bits per symbol, and 256 QAM enables a data transmission rate of 8 bits per symbol.

A higher-order modulation scheme requires a higher signal-to-interference-plus-noise-ratio (SINR) because a higher-order modulation scheme is susceptible to errors and/or packet loss due to lower robustness or reliability. Therefore, a higher-order modulation scheme is typically invoked or used only when the radio frequency condition satisfies a predetermined criterion. For example, 256 QAM may be invoked only in excellent radio frequency conditions, e.g., when SINR is equal to or above a threshold level, for example, 22 dB. In order to have a SINR meeting the 22 dB threshold, a wireless device has to be close to the base station. Thus, oftentimes, 256 QAM is invoked only when wireless devices are close to the access node. As a result, 256 QAM may rarely be invoked.

Because a higher-order modulation scheme is not invoked sufficiently, resources and capacity of the wireless network are wasted, resulting in low spectral efficiency and poor performance. Therefore, there is a need for systems and methods that can improve the spectral efficiency and/or network performance of the wireless network.

Overview

Exemplary embodiments described herein include systems, methods, and processing nodes for dynamic inter band carrier aggregation. An exemplary system described herein for inter band carrier aggregation includes an access node configured to deploy a radio air interface to provide wireless services to a plurality of wireless devices. The access node includes a processor configured to determine a location of a wireless device. The processor is also configured to compare the location of the wireless device with predetermined map data to determine whether the wireless device is located within an overlapping area between a first coverage area of a first modulation scheme on a first frequency band and a second coverage area of a second modulation scheme on a second frequency band. The processor is further configured to, when the wireless device is located within the overlapping area, perform an inter band carrier aggregation between the first frequency band and the second frequency band for the wireless device.

An exemplary method described herein for inter band carrier aggregation includes determining, by a processor, a location of a wireless device. The method also includes comparing, by the processor, the location of the wireless device with predetermined map data to determine whether the wireless device is located within an overlapping area between a first coverage area of a first modulation scheme on a first frequency band and a second coverage area of a second modulation scheme on a second frequency band. The method further includes when the wireless device is located within the overlapping area, performing, by the processor, an inter band carrier aggregation between the first frequency band and the second frequency band for the wireless device.

An exemplary processing node described herein for inter band carrier aggregation is configured to perform various operations. The operations include determining a spectral efficiency based on data transmitted between an access node and a plurality of wireless devices. The operations also include comparing the spectral efficiency with a predetermined efficiency threshold. The operations further also include when the spectral efficiency is equal to or lower than the predetermined efficiency threshold, determining whether a wireless device operating on a first frequency band using a first modulation scheme is located within an overlapping area between a first coverage area of the first modulation scheme on the first frequency band and a second coverage area of a second modulation scheme on a second frequency band. The operations further include when the wireless device is located within the overlapping area, performing an inter band carrier aggregation between the first frequency band and the second frequency band for the wireless device.

DETAILED DESCRIPTION

Figure 1:
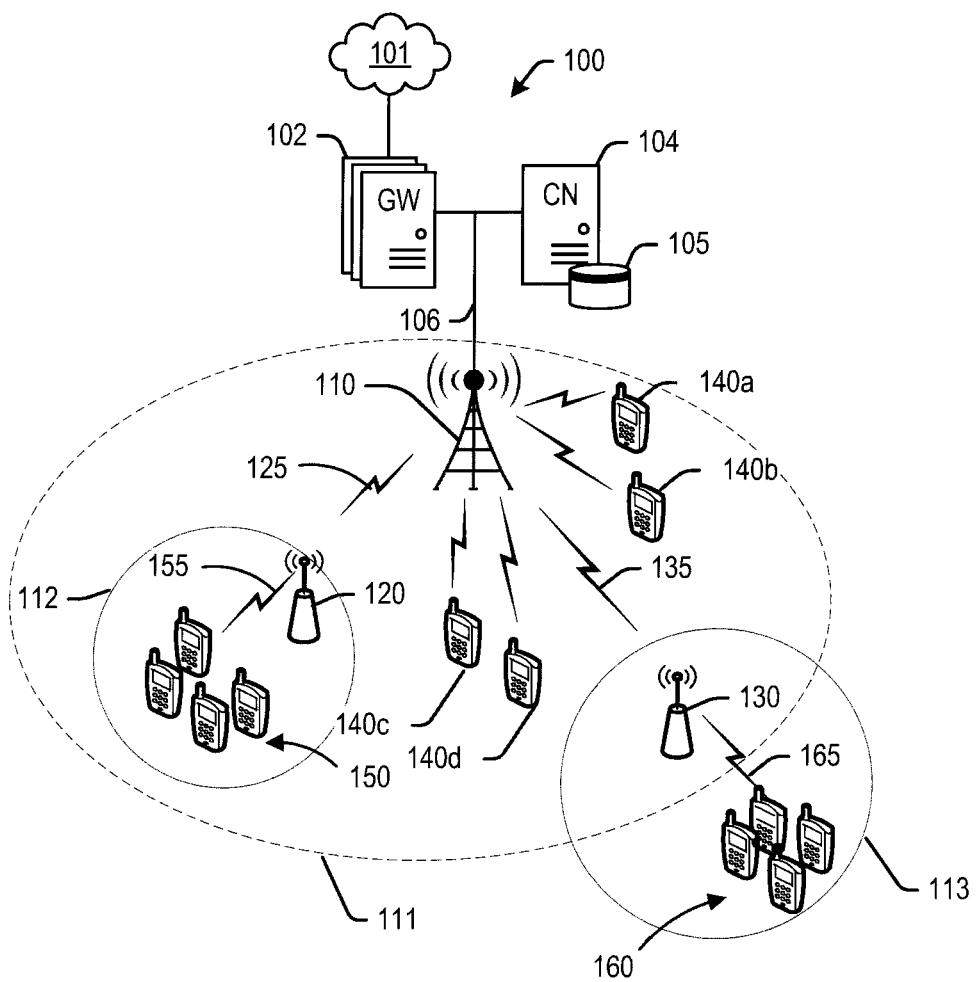
FIG. 1 depicts an exemplary system for wireless communication, in accordance with the disclosed embodiments.

Exemplary embodiments described herein include systems, methods, and processing nodes for dynamic inter band carrier aggregation for wireless devices. The disclosed systems and methods may be implemented in any wireless networks in which two or more frequency bands and two or more data modulation schemes are used for data transmission.

For example, a cell or wireless network may be provided by an access node. The access node may communicate with wireless devices using two or more frequency bands, and data may be modulated using two or more modulation schemes. The wireless devices may be configured to support both a higher frequency band and a lower frequency band, or more than two frequency bands. Among the modulation schemes, a higher-order modulation scheme enables data to be transmitted at a higher rate than a lower-order modulation scheme, but the higher-order modulation scheme may have a coverage area that is smaller than that of a lower-order modulation scheme. In other words, the coverage area of the higher-order modulation scheme may be closer to the access node than the coverage area of the lower-order modulation scheme. Because the high-order modulation scheme may be more susceptible to errors and packet loss, data communication signals may need to meet a predetermined SINR threshold in order to invoke the higher-order modulation scheme. Often times, this means the wireless devices may have to be close to the access node in order to invoke the higher-order modulation scheme. When the SINR threshold is not met (e.g., when the wireless devices are not close to the access node), wireless devices may only invoke the lower-order modulation schemes to transmit and receive data at lower rates provided by the lower-order modulation schemes. Thus, the utilization rate for the higher-order modulation scheme may be low. When the higher-order modulation scheme is insufficiently used, network resources are wasted, and spectral efficiency of the cell may be reduced.

The present disclosure provides dynamic inter band carrier aggregation for qualifying wireless devices in order to improve cell spectral efficiency. The dynamic inter band carrier aggregation may be triggered based on location of a wireless device. In some embodiments, the dynamic inter band carrier aggregation may be triggered based on the conditions of the cell, such as a spectral efficiency calculated in real time for the cell or network provided by the access node.

When the dynamic inter band carrier aggregation is triggered based on the location of the wireless device, the base station (or access node) may determine the location of the wireless in real time, or at a predetermined time interval. The determination of the location of the wireless device may be performed when the wireless device is currently operating on a higher frequency band of a plurality of frequency bands. The access node may compare the location of the wireless device with predetermined map data of an overlapping area to determine whether the wireless device is located within the overlapping area. The overlapping area is between a coverage area of a first modulation scheme on a first frequency band and a coverage area of a second modulation scheme on a second frequency band, where the first modulation scheme has a lower order than the second modulation scheme, and the first frequency band is higher than the second frequency band. In some embodiments, the access node may compare the location of the wireless device with predetermined map data of the coverage area of the second modulation scheme on the second frequency band to determine whether the wireless device, which is currently located in the coverage area of the first modulation scheme on the first frequency band, is also located within the coverage area of the second modulation scheme on the second frequency band (hence located within the overlapping area). When the wireless device is located within the overlapping area, the access node may perform an inter band carrier aggregation for the wireless device and schedule the wireless device to use the second modulation scheme (a higher-order modulation scheme) on the second frequency band (lower frequency band).

When the inter band carrier aggregation is triggered based on the conditions of the cell, such as the spectral efficiency of the cell, the access node may calculate the spectral efficiency of the cell, for example, at a predetermined time interval. When the calculated spectral efficiency of the cell is below a predetermined threshold efficiency, inter band carrier aggregation may be performed for a wireless device that is currently operating on a higher frequency band using a lower-order modulation scheme and located within an overlapping area between a coverage area of the lower-order modulation scheme on the higher frequency band and a coverage area of a higher-order modulation scheme on a lower frequency band. After the inter band carrier aggregation, the wireless device may be scheduled to take advantage of the higher data transmission rate provided by the higher-order modulation scheme on the lower frequency band, thereby increasing the data transmission rate of the wireless devices, which in turn improves the spectral efficiency of the cell.

Conventional systems trigger carrier aggregation based on the needs of wireless devices. For example, carrier aggregation may be triggered when data stored in a buffer of the wireless device meets a buffer occupancy limit. However, this carrier aggregation scheme does not promote the use of the higher-order modulation schemes because carrier aggregation may not be triggered when the buffer of the wireless device does not meet the buffer occupancy limit, even when the wireless device is located within the overlapping area between the coverage area of the higher-order modulation scheme of a lower frequency band and the coverage area of the lower-order modulation scheme of a higher frequency band. The present disclosure enables inter band carrier aggregation to be dynamically triggered based on either the location of the wireless device, which may be determined in real time, and/or based on a spectral efficiency of the cell provided by the access node, which may also be dynamically determined. By triggering the inter band carrier aggregation for the wireless device based on its location and/or the cell spectral efficiency, the higher-order modulation scheme on a lower frequency band may be more frequently invoked to increase the data transmission rate of the wireless device, which results in an improvement to the overall cell performance and spectral efficiency.

The term "spectral efficiency" refers to an information rate that can be transmitted over a frequency spectrum or band in a wireless communication network. The spectral efficiency indicates how efficient the frequency spectrum is utilized in the wireless network. The spectral efficiency may be calculated based on data currently being transmitted between an access node and one or more wireless devices. In some embodiments, the spectral efficiency may be measured in bit/second/Hz, bit/symbol, or other units.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a gigabit NodeB (gNodeB), and a plurality of end-user wireless devices. The system may also include a relay node in wireless communication with the access node and configured to relay data packets between the access node and an end-user wireless device served by the relay node.

Relay nodes may improve service quality by relaying communication between the access node and one or more end-user wireless devices in the wireless network that are indirectly connected with the access node through the relay nodes. For example, relay nodes may be used at the edge of a coverage area of an access node to improve and/or extend coverage and service, as well as in crowded areas having a high number of end-user wireless devices to increase the available throughput to the end-user wireless devices being relayed by the relay nodes. The access node may be referred to as a "donor" access node. Relay nodes are generally configured to communicate with the "donor" access node via a wireless backhaul connection, and to deploy a radio air interface to which end-user wireless devices can attach. Donor access nodes generally include scheduling modules or schedulers for scheduling or allocating resources to wireless devices directly connected thereto, as well as to the relay nodes connected to the donor access nodes through the wireless backhaul connection.

For illustrative purposes and simplicity, the disclosed technology for dynamic inter band carrier aggregation will be illustrated and discussed as being implemented in the communications between an access node (e.g., a base station) and a wireless device (e.g., an end-user wireless device or a relay node). It is understood that the disclosed technology for dynamic inter band carrier aggregation may also be applied to communication between an end-user wireless device and a relay node. For example, the communication between the end-user wireless devices and relay node employ multiple frequency bands and multiple modulation schemes, as in the communication between the access node and end-user wireless devices. The relay node may perform inter band carrier aggregation for the wireless devices, as discussed herein for the access node.

In addition to the systems and methods described herein, the operations for dynamic inter band carrier aggregation may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system for wireless communication. System 100 may be a wireless communication network, such as a cellular network. System 100 may include a communication network 101, a gateway 102, a controller node 104, and an access node 110. Access node 110 may deploy a radio air interface serving one or more relay nodes 120 and 130, and one or more end-user wireless devices. One or more end-user wireless devices may be directly connected to access node 110, such as end-user wireless devices 140a, 140b, 140c, and 140d. One or more end-user wireless devices may be indirectly connected to access node 110 through relay nodes 120 and 130, such as end-user wireless devices 150 and 160. Hereinafter, for simplicity, the directly connected and indirectly connected end-user wireless devices are generally referred to as end-user wireless devices.

In the exemplary embodiment shown in FIG. 1, access node 110 may be a macro-cell access node configured to deploy a wireless radio air interface over a coverage area 111. Each of relay nodes 120, 130, and each of end-user wireless devices 140a, 140b, 140c, and 140d may be attached to the wireless air interface deployed by access node 110. Relay nodes 120 and 130 may be configured to communicate with access node 110 over wireless communication links 125 and 135, respectively (hereinafter, "wireless backhaul" or "backhaul"). Wireless links 125 and 135, as well as other wireless links that directly couple end-user wireless devices 140a, 140b, 140c, and 140d with access node 110, as shown in FIG. 1, form the wireless network (or wireless radio air interface) deployed by access node 110 within coverage area 111.

Relay nodes 120 130 may be further configured to deploy additional wireless radio air interfaces over coverage areas 112 and 113, respectively. A plurality of end-user wireless devices 150 may be configured to attach to a wireless radio air interface or link 155 deployed by relay node 120, and a plurality of end-user wireless devices 160 may be configured to attach to a wireless air interface or link 165 deployed by relay node 130. All of the end-user wireless devices 150 and 160 are indirectly attached to the wireless radio air interface deployed by access node 110 through relay nodes 120 and 130.

In some embodiments, end-user wireless devices 150 and 160 may access network services using the combination of relay nodes 120 and 130, wireless backhaul links 125 and 135, and access node 110. In some embodiments, end-user wireless devices 140a, 140b, 140c, and 140d may access network services by directly connecting to access node 110. As shown in FIG. 1, end-user wireless devices 160 are illustrated as being located outside of coverage area 111 of access node 110. End-user wireless devices 160 may access network services provided by access node 110 through relay node 130. In this configuration, access node 110 may be referred to as a "donor" access node. In other embodiments, any other combination of donor access nodes, relay access nodes, and carriers deployed therefrom may be evident to those having ordinary skill in the art in light of this disclosure.

Access node 110 may be any network node configured to provide communication between end-user wireless devices 140a, 140b, 140c, 140d, 150, 160 and communication network 101, including standard access nodes such as a macro-cell access node, a base transceiver station, a radio base station, an eNodeB device, an enhanced eNodeB device, a gigabit NodeB (or gNodeB) in 5G New Radio ("5G NR"), or the like. For example, access node 110 may implement 5G NR technologies to deploy a wireless network that supports frequency bands ranging from, e.g., 600 MHz to 100 GHz. In some embodiments, access node 110 may deploy a wireless network that supports frequency bands ranging from 3 GHz to 100 GHz. In some embodiments, access node 110 may deploy a wireless network that supports multiple frequency bands selected from 3 GHz to 100 GHz. In an exemplary embodiment, a macro-cell access node 110 may have a coverage area 111 in the range of approximately five kilometers to thirty-five kilometers and an output power in the tens of watts. Relay nodes 120, 130 may include short range, low power, small-cell access nodes such as a microcell access node, a picocell access node, a femtocell access node, or a home eNodeB device. In addition, relay nodes 120, 130 may include a small-cell access node paired with a relay wireless device configured to communicate over one of wireless backhaul links 125, 135, respectively.

Access node 110 and relay nodes 120 and 130 may each include a processor and associated hardware circuitry configured to execute or direct the execution of computer-readable instructions to perform operations described herein. In some embodiments, access node 110 and relay nodes 120 and 130 may retrieve and execute software from a storage device, which may include a disk drive, a flash drive, a memory circuitry, or other memory device, and which may be local or remotely accessible. The software may include computer programs, firmware, or other form of machine-readable instructions, and may include an operating system, utilities, drivers, network interfaces, applications, or other type of software, including combinations thereof. Access node 110 and relay nodes 120 and 130 may receive instructions and other input at a user interface. Access node 110 may communicate with gateway 102 and controller node 104 via a communication link 106. Access node 110 and relay nodes 120 and 130 may communicate with each other, and other access nodes (not shown), using a wireless link or a wired link such as an X2 link. Components of access node 110 and relay nodes 120 and 130 are further described below.

End-user wireless devices 140a, 140b, 140c, 140d, 150, and 160 may be any device, system, combination of devices, or other such communication platform configured to wirelessly communicate with access node 110 and/or relay nodes 120 and 130 using one or more frequency bands deployed therefrom. End-user wireless devices 140a, 140b, 140c, and 140d may directly communicate with access node 110 without using a relay node, whereas end-user wireless devices 150 and 160 may indirectly communicate with access node using relay services provided by relay nodes 120 and 130. Each of end-user wireless devices 140a, 140b, 140c, 140d, 150, and 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that may send and receive signals or data. Other types of communication platforms are contemplated.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communications by end-user wireless devices 150 and 160. Wireless network protocols may include one or more of Multimedia Broadcast Multicast Services (MBMS), code division multiple access (CDMA) 1xRTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 106 may include S1 communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5G NR, and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a stand-alone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and may be used with any network architecture and/or protocol.

Controller node 104 may include a processor and associated hardware circuitry configured to execute or direct the execution of computer-readable instructions to obtain information. Controller node 104 may retrieve and execute software from a storage device, which may include a disk drive, a flash drive, a memory circuitry or device, and which may be local or remotely accessible. In an exemplary embodiment, controller node 104 may include a database 105 configured for storing information related to elements within system 100, such as configurations and capabilities of relay nodes 120 and 130, resource requirements of end-user wireless devices 140a, 140b, 140c, 140d, 150, and 160, priority levels associated therewith, and so on. The information may be requested by or shared with access node 110 via communication link 106, X2 connections, and so on. The software may include computer programs, firmware, or other form of machine-readable instructions, and may include an operating system, utilities, drivers, network interfaces, applications, or other type of software, and combinations thereof. For example, a processing node may be included in controller node 104 and configured to perform the operations described herein. In some embodiments, controller node 104 may receive instructions and other input at a user interface.

Other network elements may be included in system 100 and configured to facilitate communication but are omitted for clarity, such as base stations, base station controllers, mobile switching centers, dispatch application processors, and location registers such as a home location register or visitor location register. Furthermore, other network elements that are omitted for clarity may be included in system 100 to facilitate communication, such as additional processing nodes, routers, gateways, and physical and/or wireless data links for carrying data among the various network elements, e.g., between access node 110 and communication network 101.

Figure 2:
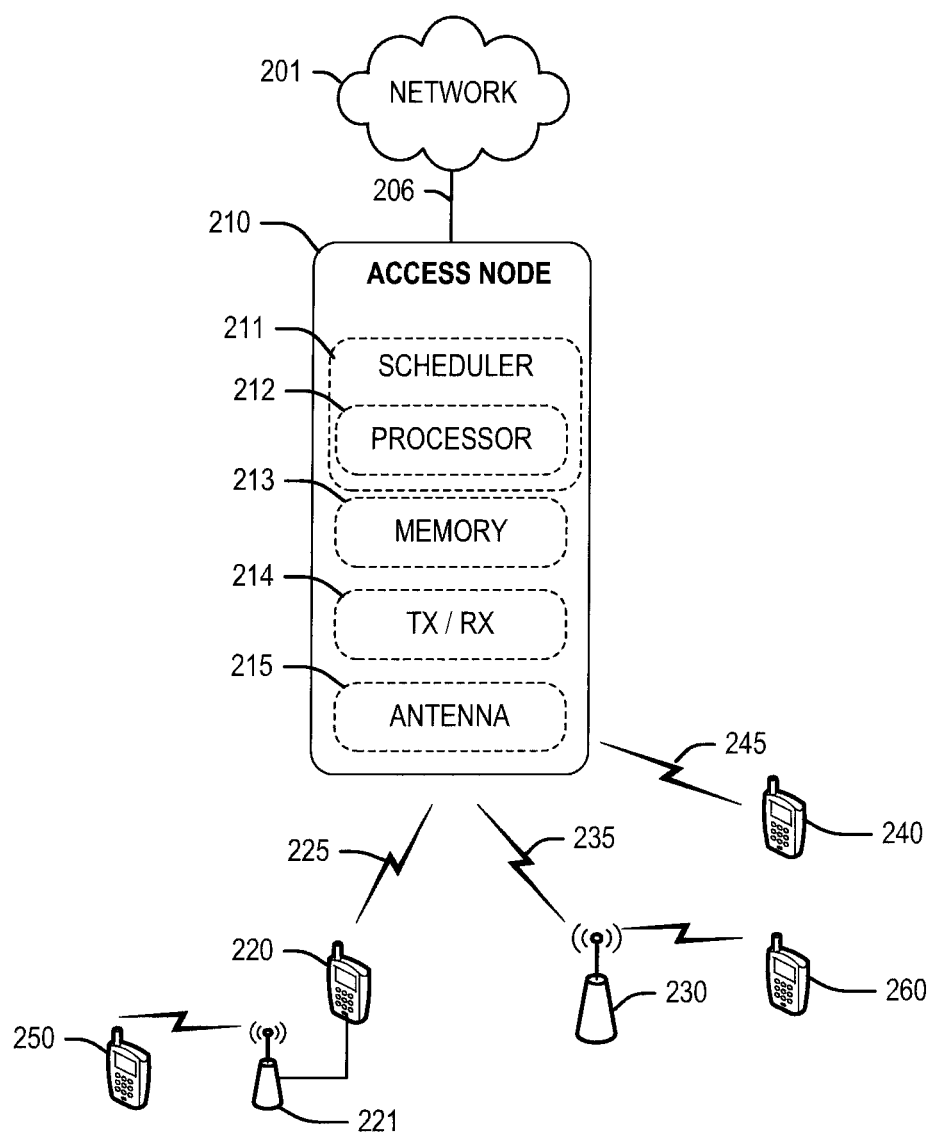
FIG. 2 depicts an exemplary access node, in accordance with the disclosed embodiments.

FIG. 2 depicts an exemplary access node 210. Access node 210 may include, for example, a macro-cell access node. Access node 210 may be an embodiment of access node 110 described with reference to FIG. 1. Access node 210 may include a scheduler 211, which may include a processor 212. Access node 210 may also include a memory 213, a transceiver 214, and an antenna 215. Scheduler 211 may be configured to schedule or allocate resources, including downlink and uplink resources, for relay nodes communicatively coupled to access node 210 and/or end-user wireless devices that are directly connected with access node 210. In some embodiments, processor 212 of scheduler 211 may be configured to execute instructions stored on memory 213 for performing various methods disclosed herein. Transceiver 214 and antenna 215 may be configured to enable wireless communication with a relay wireless device 220, a relay node 230, and an end-user wireless device 240.

Relay wireless device 220 may communicate with access node 210 through a wireless link 225. Relay node 230 may communicate with access node 210 through a wireless link 235. End-user wireless device 240 may communicate with access node 210 through a wireless link 240. Wireless links 225, 235, and 245 may form the wireless network (or wireless radio air interface) deployed by access node 210. Instructions stored on memory 213 may be accessed and executed by processor 212 to perform operations disclosed herein, such as deploying a wireless radio air interface (e.g., including wireless links 225, 235, and 245) via one or more of transceiver 214 and antenna 215. The operations performed by processor 212 may also include enabling relay wireless device 220, relay node 230, and end-user wireless devices 240 to access network services from a network 201 via access node 210.

Network 201 may be similar to network 101 discussed above. The operations performed by processor 212 may further include enabling relay wireless device 220 to communicate with end-user wireless device 250 and a relay access point 221, and enabling relay node 230 to communicate with end-user wireless device 260 and access node 210. Relay wireless device 220 and relay access point 221 may be referred to as a relay node as well. Although memory 213 is shown as separated from scheduler 211, in some embodiments, memory 213 may be included in scheduler 211. Alternatively, scheduler 211 may include an additional memory. In some embodiments, access node 210 may be referred to as a donor access node.

Figure 3:
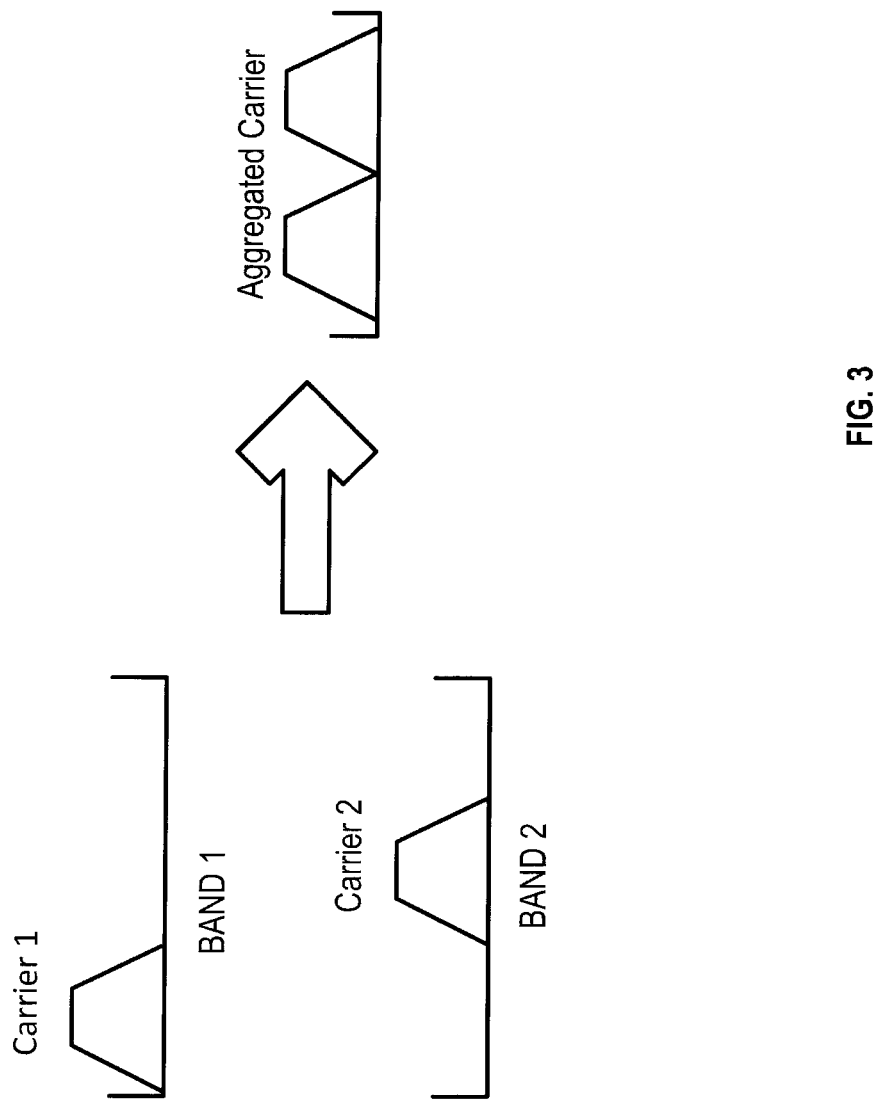
FIG. 3 depicts an exemplary inter band carrier aggregation, in accordance with the disclosed embodiments.

FIG. 3 depicts an exemplary inter band carrier aggregation, in accordance with the disclosed embodiments. Inter band carrier aggregation aggregates carrier components from different frequency band. For example, as illustrated in FIG. 3, carrier 1 in frequency Band 1 may be aggregated with carrier 2 in frequency Band 2 in order to result in a wider bandwidth, the aggregated carrier, for carrying data for the downlink and/or uplink data transmission between a wireless device and access node 110. Although only one carrier is shown in each Band to illustrate inter band carrier aggregation, it is understood that more than one component carrier may be selected from each Band for performing the carrier aggregation. The same or different number of component carriers may be selected from each Band. Component carriers 1 and 2 may have the same bandwidth or different bandwidths.

Figure 4:
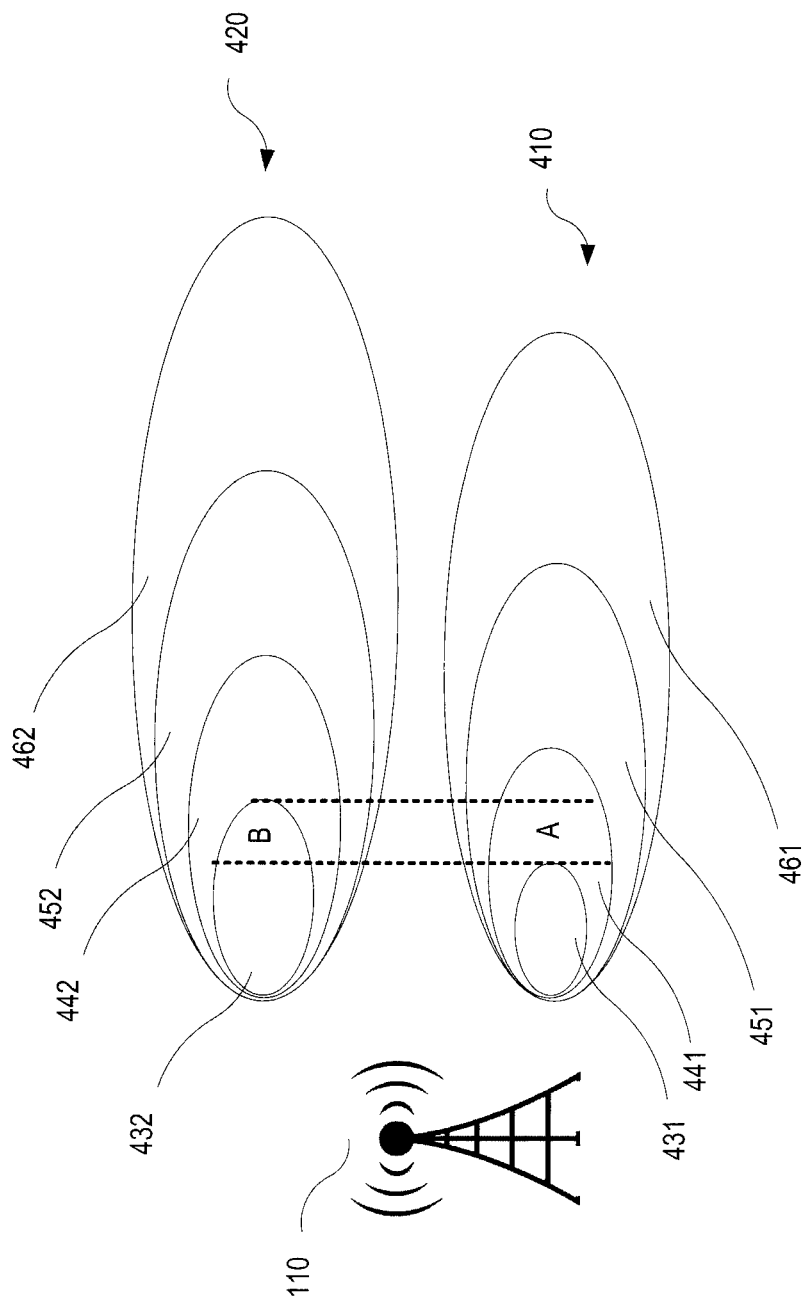
FIG. 4 depicts exemplary coverage areas of different modulation schemes on different frequency bands, in accordance with the disclosed embodiments.

FIG. 4 depicts exemplary coverage areas of different modulation schemes on different frequency bands, in accordance with the disclosed embodiments. Access node 110 may communicate with wireless devices (not shown) on multiple frequency bands, such as, for example, 859-894 MHz (which may be referred to as band B26), 1930-1995 MHz (which may be referred to as band B25), and 2496-2690 MHz (which may be referred to as band B41). A first frequency band 410 shown in FIG. 4 may be a higher frequency band among the multiple frequency bands, and a second frequency band 420 may be a lower frequency band as compared to the first frequency band. For example, first frequency band 410 may be 1930-1995 MHz, and second frequency band 420 may be 859-894 MHz. In some embodiments, first frequency band 410 may be 2496-2690 MHz and second frequency band may be 1930-1995 MHz or 859-894 MHz. Wireless devices may be configured to support one or more of the multiple frequency bands used by access node 110. For example, some wireless devices may be configured to support only one frequency band, some may be configured to support two frequency bands, and some may be configured to support three or more frequency bands.

The wireless network deployed by access node 110 may use multiple modulation schemes to modulate and transmit data for uplink and downlink transmissions. For example, the wireless network deployed by access node 110 may implement QPSK, 16 QAM, 64 QAM, and 256 QAM modulation schemes for the data transmission. Other modulation schemes may also be used. The modulation schemes may be invoked on any of the frequency bands supported by access node 110. Each modulation scheme may have a coverage area. For example, on the first frequency band 410, 256 QAM may have a coverage area 431, 64 QAM may have a coverage area 441, 16 QAM may have a coverage area 451, and QPSK may have a coverage area 461. On second frequency band 420, 256 QAM may have a coverage area 432, 64 QAM may have a coverage area 442, 16 QAM may have a coverage area 452, and QPSK may have a coverage area 462. The coverage area associated with each frequency band includes the coverage areas of the different modulation schemes on that frequency band. The coverage areas of the modulation schemes on the first frequency band 410 and the second frequency band 420 are shown as separate areas for illustrative purposes only. One of ordinary skill in the art would understand that the coverage areas of different frequency bands cover different portions of the same physical site or cell associated with access node 110.

As shown in FIG. 4, the coverage areas of the modulation schemes are larger (further away from access node 110) for the lower frequency band (e.g., second frequency band 420) and smaller (closer to access node 110) for the higher frequency band (e.g., first frequency band 410). For the modulation schemes in the same frequency band, a higher-order modulation scheme has a smaller coverage area (closer to access node 110), and a lower-order modulation scheme has a larger coverage area (farther away from access node 110). For example, for first frequency band 410, coverage area 431 of 256 QAM is smaller than coverage area 441 of 64 QAM, which is smaller than coverage area 451 of 16 QAM, which is smaller than coverage area 461 of QPSK. As discussed above, 256 QAM is associated with a higher data transmission rate than 64 QAM, which is associated with a higher data transmission rate than 16 QAM, which is associated with a higher data transmission rate than QPSK.

In addition, as shown with the parallel dotted lines in FIG. 4, coverage area 432 of 256 QAM on second frequency band (a lower frequency band) has a portion that overlaps coverage area 441 of 64 QAM on first frequency band (a higher frequency band). That is, portion B of coverage area 432 partially overlaps portion A of coverage area 441. Wireless devices located in coverage area A on first frequency band 410 may be located within an overlapping area between coverage areas A and B. Similarly, coverage area 451 of 16 QAM on frequency band 410 has a portion overlapping coverage area 442 of 64 QAM on frequency band 420, and coverage area 461 of QPSK has a portion overlapping coverage area 452 of 16 QAM on frequency band 420.

In a conventional system that uses multiple frequency bands, a wireless device may be first placed on a higher frequency band because the higher frequency band may have a wider bandwidth. The conventional system may not place the wireless device on the lower frequency band unless the wireless device has moved out of the coverage area of the higher frequency band into a coverage area of the lower frequency band. Because the coverage areas of the lower frequency band and the higher frequency band overlap with each other, with the coverage area of the lower frequency band extending further beyond the coverage area of the higher frequency band, for a conventional system that has a preference for placing a wireless device on a higher frequency band, this means the wireless device can rarely take advantage of the higher-order modulation scheme of a lower frequency band because when the wireless device is placed on the lower frequency band, it is already out of the coverage area of higher-order modulation schemes. The wireless device may be placed on the lower frequency band when the wireless device is moved out of the coverage area of the higher frequency band. At that location, the wireless device can only use the lower-order modulation scheme on the lower frequency band. Thus, the higher-order modulation schemes on the lower frequency band are rarely invoked, which results in a waste of the resources on the lower frequency band. The disclosed systems and methods promote the utilization of the higher-order modulation schemes on a lower frequency band, thereby increasing the system efficiency, capacity, and throughput.

According to the present disclosure, carrier aggregation may be performed for wireless devices currently operating on a higher frequency band among multiple frequency bands supported by the cell, and which are also located within an overlapping area between a coverage area of a lower-order modulation scheme on the higher frequency band and a coverage area of a higher-order modulation scheme on a lower frequency band. For example, carrier aggregation may be performed for wireless devices located within the overlapping area between coverage areas A and B. The carrier aggregation allows the wireless devices located in the overlapping area between coverage area 441 of 64 QAM on first frequency band 410 (higher frequency band) and coverage area 432 of 256 QAM on second frequency band 420 (lower frequency band) to invoke 256 QAM on second frequency band 420 (lower frequency band). After the carrier aggregation is performed for the wireless devices, a scheduler of access node 110 may configure the wireless devices to use 256 QAM modulation scheme for modulating and transmitting or receiving data.

Likewise, carrier aggregation may be performed for wireless devices located within an overlapping area between coverage area 451 of 16 QAM on first frequency band 410 and coverage area 442 of 64 QAM on second frequency band 420, to enable the wireless devices currently operating on the higher frequency band (first frequency band 410) using the lower-order modulation scheme 16 QAM to invoke the higher-order modulation scheme 64 QAM on the lower frequency band (second frequency band 420). In addition, carrier aggregation may be performed for wireless devices located within an overlapping area between coverage area 461 of QPSK on the higher frequency band (first frequency band 410) and coverage area 452 of 16 QAM on the lower frequency band (second frequency band 420), to enable the wireless devices currently operating on the higher frequency band using the lower-order modulation scheme QPSK to use the higher-order modulation scheme 16 QAM on the lower frequency band.

In some embodiments, inter band carrier aggregation may be dynamically triggered for the wireless devices located within the overlapping area between a coverage area of a lower-order modulation scheme on a higher frequency band and a coverage area of a higher-order modulation scheme on a lower frequency band. For example, the inter band carrier aggregation may be triggered for wireless devices based on the location of the wireless devices. For example, when a wireless device currently operating on a higher frequency band and located within a coverage area of a lower-order modulation scheme is also located within a coverage area of a higher-order modulation scheme on a lower frequency band, access node 110 may perform inter band carrier aggregation for the wireless device, and schedule the wireless device to use the higher-order modulation scheme on the lower frequency band. The trigger may be based on the location of the wireless device determined in real time. The location of the wireless device may be determined based on positioning data received from the wireless device, such as Global Positioning System (GPS) data, positioning data relative to the location of the cell, etc. Access node 110 may compare the location of the wireless device with predetermined map data for different modulation schemes on different frequency bands to determine whether the wireless device is located within an overlapping area between a coverage area of a higher-order modulation scheme on a lower frequency band and a coverage area of a lower-order modulation scheme on a higher frequency band.

In some embodiments, the dynamic inter band carrier aggregation may be triggered based on the spectral efficiency of the wireless network or cell deployed by access node 110. Access node 110 may calculate the spectral efficiency based on data being currently transmitted between access node 110 and the wireless devices on all frequency bands. The methods of calculating the spectral efficiencies are known to a person of ordinary skill in the art, and are therefore not described in detail. In some embodiments, access node 110 may calculate a spectral efficiency for each of the frequency bands, and may use the sum of the spectral efficiencies of the frequency bands as the overall spectral efficiency for the cell or wireless network deployed by access node 110. Other statistical values (e.g., average of the spectral efficiencies of all frequency bands) may also be used.

For example, based on the data being currently transmitted within the cell, access node 110 may calculate the spectral efficiency of the cell to be 4 bit/s/Hz, 10 bit/s/Hz, etc. The calculation of the spectral efficiency of the cell may be performed periodically or aperiodically. For example, the calculation of the spectral efficiency may be performed at every 5 minutes, 10 minutes, 20 minutes, etc. In some embodiments, the calculation of the spectral efficiency of the cell may be performed based on another condition associated with the cell. For example, the other condition that may trigger the calculation of the spectral efficiency of the cell may include the number of wireless devices operating on a certain frequency band exceeding a predetermined number. As such, the inter band carrier aggregation for the wireless devices may be dynamically triggered based on conditions of the cell.

A predetermined efficiency threshold (e.g., 5 bit/s/Hz, 8 bit/s/Hz, etc.) may be set by the operator of the cell. Access node 110 may compare the calculated spectral efficiency of the cell with the predetermined efficiency threshold. When the calculated spectral efficiency is equal to or lower than the predetermined efficiency threshold, access node 110 may determine to perform inter band carrier aggregation for certain wireless devices in order to increase the overall cell spectral efficiency. Access node 110 may identify the wireless devices to be wireless devices that are operating on first frequency band 410 (higher frequency band) using a first, lower-order modulation scheme (e.g., 64 QAM) and that are also located within coverage area 432 of a second, higher-order modulation scheme (e.g., 256 QAM) on second frequency band 420 (lower frequency band). That is, the wireless devices may be identified as those operating on the higher frequency band using a lower-order modulation scheme, and are also located within the overlapping area of the coverage area of the lower-order modulation scheme on the higher frequency band and the coverage area of the higher-order modulation scheme on the lower frequency band. Access node 110 may perform an inter band carrier aggregation between first frequency band 410 and second frequency band 420 for the identified wireless devices, thereby enabling the identified wireless devices to use the higher-order modulation scheme (e.g., 256 QAM) on the lower, second frequency band 420.

Figure 5:
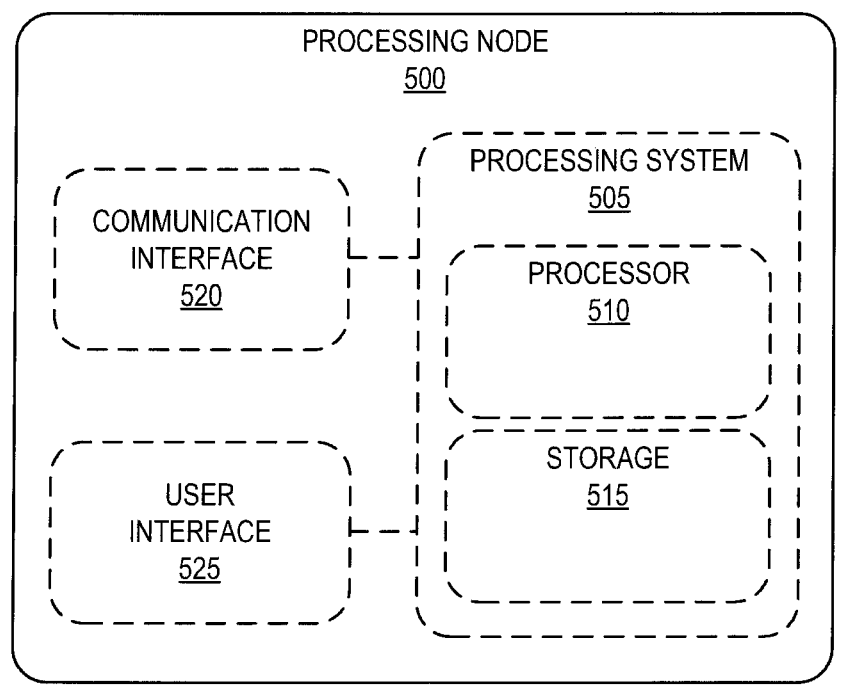
FIG. 5 depicts an exemplary processing node, in accordance with the disclosed embodiments.

FIG. 5 depicts an exemplary processing node 500, which may be configured to perform the methods and operations disclosed herein for dynamic inter band carrier aggregation for a wireless device. In some embodiments, processing node 500 may be included in an access node, such as access node 110 or 210. In some embodiments, processing node 500 may be included in controller node 104, and may be configured for controlling the access nodes.

Processing node 500 may be configured for performing dynamic inter band carrier aggregation for one or more wireless devices. The inter band carrier aggregation may be performed dynamically based on the location of the wireless device determined in real time, and/or based on a spectral efficiency of the cell or wireless network deployed by access node 110. Processing node 500 may include a processing system 505. Processing system 505 may include a processor 510 and a storage device 515. Storage device 515 may include a disk drive, a flash drive, a memory, or other storage device configured to store data and/or computer readable instructions or codes (e.g., software). The computer executable instructions or codes maybe accessed and executed by processor 510 to perform various methods disclosed herein. Software stored in storage device 515 may include computer programs, firmware, or other form of machine-readable instructions, including an operating system, utilities, drivers, network interfaces, applications, or other type of software. For example, software stored in storage device 515 may include a module for performing various operations described herein. Processor 510 may be a microprocessor and may include hardware circuitry and/or embedded codes configured to retrieve and execute software stored in storage device 515.

Processing node 500 may include a communication interface 520 and a user interface 525. Communication interface 520 may be configured to enable the processing system 505 to communicate with other components, nodes, or devices in the wireless network. Communication interface 520 may include hardware components, such as network communication ports, devices, routers, wires, antenna, transceivers, etc. User interface 525 may be configured to allow a user to provide input to processing node 500 and receive data or information from processing node 500. User interface 525 may include hardware components, such as touch screens, buttons, displays, speakers, etc. Processing node 500 may further include other components such as a power management unit, a control interface unit, etc.

Figure 6:
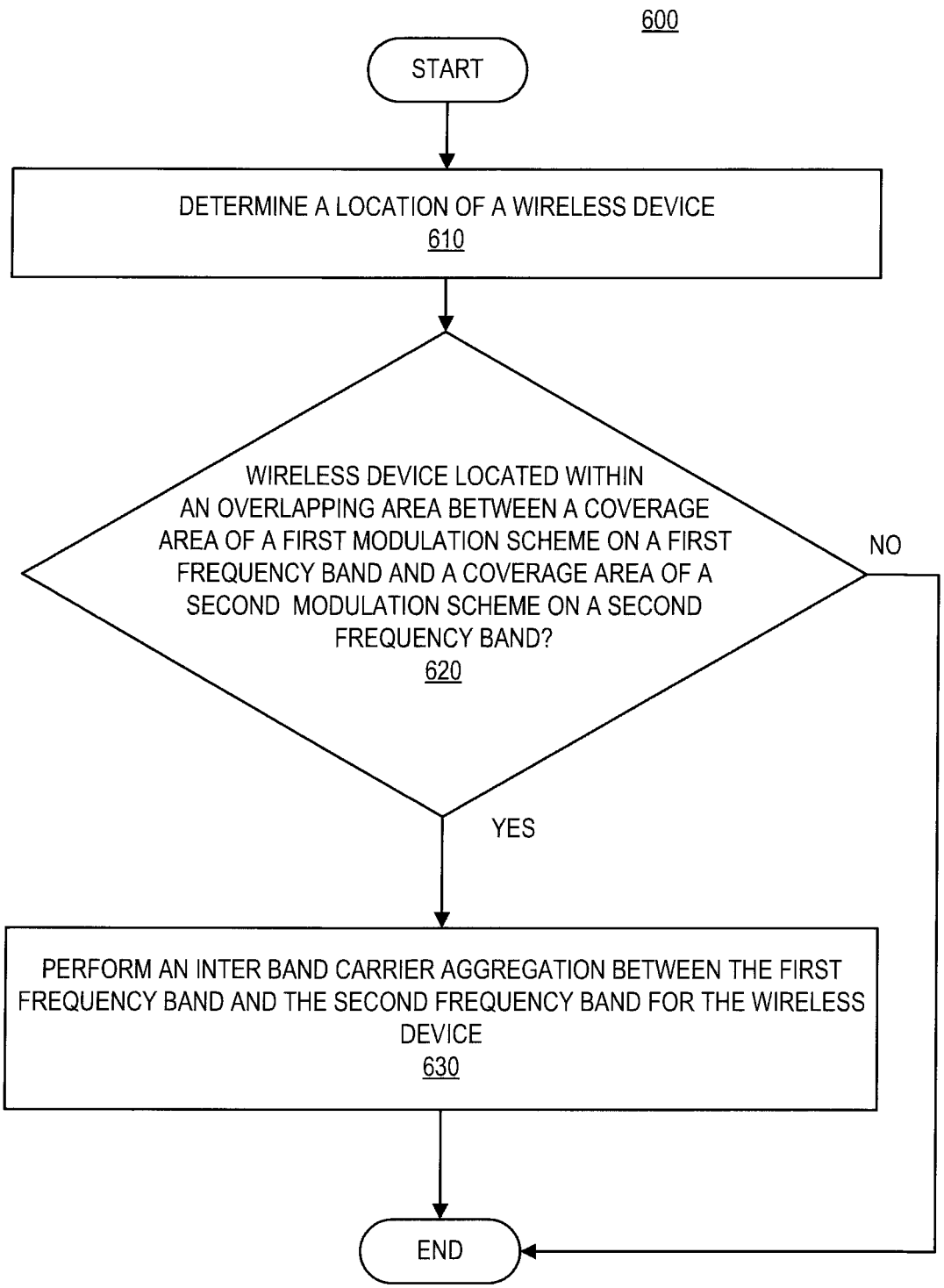
FIG. 6 depicts an exemplary method for dynamic inter band carrier aggregation, in accordance with the disclosed embodiments.

The disclosed methods for dynamic inter band carrier aggregation are discussed further below. FIG. 6 illustrates an exemplary method for dynamic inter band carrier aggregation for one or more wireless devices. Method 600 may be performed by any suitable processor discussed herein, for example, a processor included in access node 110 or 210, processor 510 included in processing node 500, or a processor included in controller node 104. For discussion purposes, as an example, method 600 is described as being performed by a processor included in access node 110.

Method 600 may include determining a location of a wireless device (step 610). For example, access node 110 may determine a location or position of a wireless device based on GPS data received from the wireless device or based on other cellular data received from the wireless device that may be used to determine the location of the wireless device within the cell (e.g., data that may be used to determine the location of the wireless device relative to the location of access node 110). Access node 110 may determine the location of the wireless device in real time or at a predetermined time interval (e.g., every 1 minute, 2 minutes, 5 minutes, etc.). Access node 110 may determine the location of the wireless device when the wireless device is currently operating on a higher frequency band of a plurality of frequency bands supported by access node 110 and the wireless device. For example, the cell and the wireless device may support three frequency bands, a high frequency band (e.g., 2496-2690 MHz), a medium frequency band (e.g., 1930-1995 MHz), and a low frequency band (e.g., 859-894 MHz). Access node 110 may determine the location of the wireless device when the wireless device is operating on the high frequency band, or on the medium frequency band. Access node 110 may not determine the location of the wireless device when the wireless device is currently operating on the low frequency band. In some embodiments, the location determination may be performed in real time as the wireless device may constantly transmit positioning data to access node 110. In some embodiments, the location determination may be performed at every predetermined time interval.

Method 600 may include determining whether the wireless device is within an overlapping area between a coverage area of a first modulation scheme on a first frequency band and a coverage area of a second modulation scheme on a second frequency band (step 620). For example, access node 110 may determine whether the wireless device is located within an overlapping area between coverage area 441 of modulation scheme 64 QAM on first frequency band 410 and coverage area 432 of modulation scheme 256 QAM on second frequency band 420, or within an overlapping area between coverage area 451 and coverage area 442, or within an overlapping area between coverage area 461 and coverage area 452.

In some embodiments, access node 110 may compare the location of the wireless device (such as the GPS data) with predetermined map data of the overlapping area. For example, the map data of the overlapping area may be stored in a table or database, and access node 110 may compare the location of the wireless device with the stored map data of the overlapping area. As another example, access node 110 may compare the location of the wireless device with predetermined map data of coverage area 432 to determine whether the wireless device, which is located within coverage area 441, is also located within the coverage area 432 (hence located within the overlapping area between coverage areas 441 and 432). As a further example, access node 110 may compare the location of the wireless device with predetermined map data of coverage area 442 to determine whether the wireless device, which is located within coverage area 451, is also located within the coverage area 442 (hence located within the overlapping area between coverage areas 451 and 442). Likewise, access node 110 may compare the location of the wireless device with predetermined map data of coverage area 452 to determine whether the wireless device, which is located within coverage area 461, is also located within coverage area 452.

When the wireless device is located within the overlapping area (Yes, step 620), method 600 may include performing an inter band carrier aggregation between the first frequency band and the second frequency band for the wireless device (step 630). For example, after determining that the wireless device is located within the overlapping area between coverage area 441 and coverage area 432, access node 110 may perform an inter band carrier aggregation to aggregate component carriers from first frequency band 410 and second frequency band 420. The inter band carrier aggregation may enable access node 110 to schedule the wireless device to use the higher-order modulation scheme, 256 QAM (having coverage area 432), on the lower frequency band, e.g., second frequency band 420. When the wireless device is not located within the overlapping area (No, step 620), method 600 may not perform an inter band carrier aggregation for the wireless device.

Method 600 for inter band carrier aggregation may be dynamically performed. Wireless devices are mobile, and may move from one coverage area to another. When the wireless devices move from a coverage area of a lower-order modulation scheme on a higher frequency band into an overlapping area such that the wireless devices are also located within a coverage area of a higher-order modulation scheme on a lower frequency band, access node 110 may perform inter band carrier aggregations for the wireless devices currently operating on the higher frequency band using the lower-order modulation scheme, such that the wireless devices can be scheduled to use the higher-order modulation scheme, thereby increasing the data transmission rates. In some embodiments, access node 110 may detect the entry of the wireless devices currently operating on a higher frequency band into an overlapping area based on the real time location data of the wireless devices. Upon detection, access node 110 may perform an inter band carrier aggregation for the wireless devices to enable the wireless devices to use the higher-order modulation scheme on the lower frequency band.

For example, at a first time instance, a wireless device may be located within coverage area 441 of a lower-order modulation scheme, 64 QAM, of a higher frequency band, first frequency band 410. The wireless device may be using the lower-order modulation scheme 64 QAM to transmit and receive data over the higher frequency band, first frequency band 410. At the first time instance, the wireless device may be located outside of coverage area 432 of a higher-order modulation scheme, 256 QAM, of a lower frequency band, second frequency band 420. At a second time instance, the wireless device may be moved into the overlapping area, i.e., the overlapping area between coverage portions A and B of coverage areas 441 and 432, as shown in FIG. 4. Upon detecting that the wireless device has been moved into the overlapping area, access node 110 may perform an inter band carrier aggregation for the wireless device, which aggregates the lower frequency band, second frequency band 420, and the higher frequency band, first frequency band 410. Access node 110 may schedule, through a scheduler included in access node 110, the wireless device to transmit and receive data using the higher-order modulation scheme, 256 QAM, on the lower frequency band, second frequency band 420, thereby transmitting and receiving data at the higher data transmission rate provided by the higher-order modulation scheme. When access node 110 detects that the wireless device has been moved out of the overlapping area and into an area of the coverage area 441 of the lower-order modulation scheme, 64 QAM, on the higher frequency band, first frequency band 410, access node 110 may reverse or deactivate the inter band carrier aggregation for the wireless device. Access node 110 may schedule the wireless device to use the lower-order modulation scheme, 64 QAM, on the higher frequency band, first frequency band 410. Thus, as the wireless devices are moved between different coverage areas of the different modulation schemes on different frequency bands, the disclosed systems and methods may enable dynamic selection of the frequency band and the modulation scheme by enabling or disabling inter band carrier aggregation based on the location of the wireless device.

Figure 7:
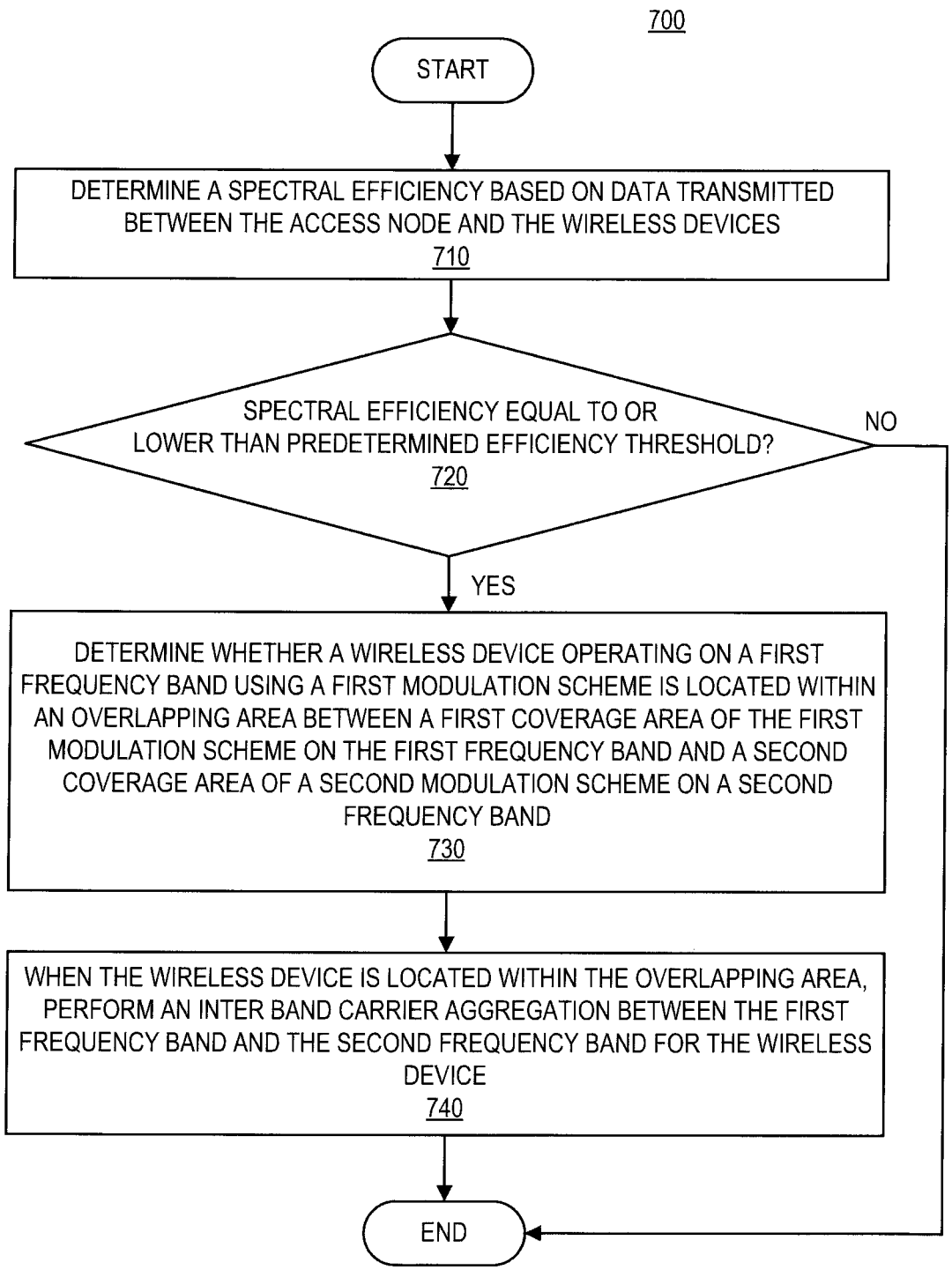
FIG. 7 depicts another exemplary method for dynamic inter band carrier aggregation, in accordance with the disclosed embodiments.

FIG. 7 illustrates another exemplary method for dynamic inter band carrier aggregation for one or more wireless devices. Method 700 may be performed by any suitable processor discussed herein, for example, a processor included in access node 110 or 210, processor 510 included in processing node 500, or a processor included in controller node 104. For discussion purposes, as an example, method 700 is described as being performed by a processor included in access node 110. Compared with method 600, method 700 includes additional steps or operations. In method 700, the inter band carrier aggregation may be triggered based on a spectral efficiency of the cell.

Method 700 may include determining a spectral efficiency based on data transmitted between access node 110 and the wireless devices (step 710). For example, access node 110 may calculate the spectral efficiency of the cell or wireless network deployed by access node 110 based on the data currently being transmitted on all of the frequency bands used in the cell. In some embodiments, access node 110 may calculate a spectral efficiency for each frequency band based on the data currently being transmitted on that frequency band. Access node 110 may calculate a sum of all of the spectral efficiencies calculated for all of the frequency bands. Access node 110 may use the sum as the spectral efficiency of the cell. Other statistical values of the spectral frequencies of the frequency bands (e.g., average value) may also be used as the spectral efficiency of the cell.

Access node 110 may calculate the spectral efficiency periodically or aperiodically based on the data currently being transmitted. For example, access node 110 may calculate the spectral efficiency of the cell at a predetermined time interval, such as 1 minute, 3 minutes, 5 minutes, 10 minutes, etc. The predetermined time interval may be configured by the operator of the cell. In some embodiments, access node 110 may determine the spectral efficiency aperiodically (e.g., randomly) or on demand, e.g., when an operator of the cell requests the spectral efficiency to be calculated. In some embodiments, access node 110 may calculate the spectral efficiency of the cell based on other conditions of the cell. For example, when access node 110 detects that a number of wireless devices on a particular frequency band exceeds a predetermined number, access node 110 may calculate the spectral efficiency for the cell. As another example, when access node 110 detects that an amount of data being transmitted over a particular frequency band is greater than an amount of data being transmitted over other frequency bands by a predetermined threshold, access node 110 may perform the calculation of the spectral efficiency. As a further example, when access node 110 detects that an amount of data being transmitted over a particular frequency band is greater than a predetermined amount, access node 110 may perform the calculation of the spectral efficiency. The spectral efficiency of the cell may be calculated to determine whether to perform inter band carrier aggregation for certain wireless devices in order to increase the overall spectral efficiency of the cell.

Method 700 may also include determining whether the calculated spectral efficiency of the cell is equal to or lower than a predetermined efficiency threshold (step 720). When the calculated spectral efficiency is not equal to or lower than (i.e., is higher than) the predetermined efficiency threshold (No, step 720), access node 110 may not perform carrier aggregation. When the calculated spectral efficiency is equal to or lower than the predetermined efficiency threshold (Yes, step 720), access node 110 may decide to perform inter band carrier aggregations for certain wireless devices in order to improve the overall spectral efficiency of the cell.

Access node 110 may determine a location of a wireless device currently operating on a higher frequency band (e.g., first frequency band 410), for example, based on positioning data, such as GPS data or other positioning cellular data received from the wireless device, which can be used to calculate the location of the wireless device within the cell. The location determination for the wireless device may be performed in real time, as access node 110 receives the positioning data from the wireless device. Access node 110 may determine whether the wireless device currently operating on the first frequency band using a first modulation scheme is located within an overlapping area between a first coverage area of the first modulation scheme on the first frequency band and a second coverage area of a second modulation scheme on a second frequency band (step 730).

For example, for each wireless device that is currently operating on first frequency band 410 (a higher frequency band) on a lower-order modulation scheme (e.g., 64 QAM), access node 110 may determine, based on the location of the wireless device, whether the wireless device is within an overlapping area between coverage area 441 of modulation scheme 64 QAM (a lower-order modulation scheme when compared to 256 QAM) on first frequency band 410 and coverage area 432 of modulation scheme 256 QAM (a higher-order modulation scheme when compared to 64 QAM) on second frequency band 420 (a lower frequency band). Access node 110 may compare the location of the wireless device with predetermined map data of the overlapping area, or compare the location of the wireless device with map data of coverage area 432 to determine whether the wireless device is located within the overlapping area between coverage areas 432 and 441.

When access node 110 determines that the wireless device is located within the overlapping area, access node 110 may perform an inter band carrier aggregation between the first frequency band and the second frequency band for the wireless device (step 740). Access node 110 may perform the inter band carrier aggregation for a number of the wireless devices that are currently operating on the first frequency band using a lower-order modulation scheme and that are determined to be also located within the overlapping area. The number of wireless devices may be identified based on their locations. In some embodiments, a number of component carriers may be selected from first frequency band 410 and aggregated with a number of component carriers selected from second frequency band 420. The carrier aggregation may enable the wireless devices located within an overlapping area, which are currently operating on the higher frequency band (first frequency band 410) using a lower-order modulation scheme (e.g., modulation scheme 64 QAM) to use a higher-order modulation scheme (e.g., modulation scheme 256 QAM) on a lower frequency band (e.g., second frequency band 420), thereby increasing the data transmission rates and the overall spectral efficiency of the cell.

In some embodiments, methods 600 and 700 may include additional steps or operations. For example, methods 600 and 700 may each include scheduling the wireless device to use the second modulation scheme on the second frequency band. In some embodiments, method 600 may include switching back to the lower-order modulation scheme on the higher frequency band when the wireless device moves out of the overlapping area between the coverage area of the higher-order modulation scheme on the lower frequency band and the coverage area of the lower-order modulation scheme on the higher frequency band. Methods 600 and 700 are not mutually exclusive. As one of ordinary skill in the art would understand, method 600 may be part of method 700, such as part of steps 730 and 740.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for inter band carrier aggregation, comprising:
    an access node configured to deploy a radio air interface to provide wireless services to a plurality of wireless devices, the access node comprising:
        a processor configured to:
            determine a spectral efficiency of based on data transmitted between the access node and the wireless device; and
            compare the spectral efficiency with a predetermined efficiency threshold;
        wherein when spectral efficiency is equal to or lower than the predetermined efficiency threshold, the processor is further configured to:
            determine a location of a wireless device;
            compare the location of the wireless device with predetermined map data to determine whether the wireless device is located within an overlapping area between a first coverage area of a first modulation scheme on a first frequency band and a second coverage area of a second modulation scheme on a second frequency band; and
            when the wireless device is located within the overlapping area, perform an inter band carrier aggregation between the first frequency band and the second frequency band for the wireless device.

2. The system of claim 1, wherein the first modulation scheme is associated with a first data transmission rate, and the second modulation scheme is associated with a second data transmission rate that is greater than the first data transmission rate.

3. The system of claim 1, wherein the second coverage area is greater than the first coverage area.

4. The system of claim 1, wherein the first modulation scheme is 64 QAM (quadrature amplitude modulation) and the second modulation scheme is 256 QAM.

5. The system of claim 1, wherein the first modulation scheme is 16 QAM (quadrature amplitude modulation) and the second modulation scheme is 64 QAM.

6. The system of claim 1, wherein the first modulation scheme is QPSK (Quadrature Phase Shift Keying) and the second modulation scheme is 16 QAM.

7. The system of claim 1, wherein determining the location of the wireless device comprises determining the location of the wireless device based on Global Positioning System (GPS) data received from the wireless device.

8. The system of claim 1, wherein determining the location of the wireless device comprises determining the location of the wireless device when the wireless device is operating on the first frequency band that is higher than the second frequency band.

9. The system of claim 1, wherein the first frequency band is higher than the second frequency band.

10. The system of claim 1, wherein the processor is further configured to schedule the wireless device to use the second modulation scheme on the second frequency band.

11. A method for inter band carrier aggregation, comprising:
    determining, by a processor, a spectral efficiency of based on data transmitted between an access node and a wireless device; and
    comparing, by the processor, the spectral efficiency with a predetermined efficiency threshold;
wherein when spectral efficiency is equal to or lower than the predetermined efficiency threshold, the method further comprising:
    determining, by the processor, a location of the wireless device;
    comparing, by the processor, the location of the wireless device with predetermined map data to determine whether the wireless device is located within an overlapping area between a first coverage area of a first modulation scheme on a first frequency band and a second coverage area of a second modulation scheme on a second frequency band; and when the wireless device is located within the overlapping area, performing, by the processor, an inter band carrier aggregation between the first frequency band and the second frequency band for the wireless device.

12. The method of claim 11, wherein the first modulation scheme is associated with a first data transmission rate, and the second modulation scheme is associated with a second data transmission rate that is greater than the first data transmission rate.

13. The method of claim 11, wherein determining the location of the wireless device comprises determining the location of the wireless device based on Global Positioning System (GPS) data received from the wireless device.

14. The method of claim 11, further comprising scheduling the wireless device to use the second modulation scheme on the second frequency band.

15. The method of claim 11, wherein determining the location of the wireless device comprises determining the location of the wireless device when the wireless device is operating on the first frequency band that is higher than the second frequency band.

16. The method of claim 11, wherein the first modulation scheme is 64 QAM (quadrature amplitude modulation) and the second modulation scheme is 256 QAM.

17. The method of claim 11, wherein the first modulation scheme is 16 QAM (quadrature amplitude modulation) and the second modulation scheme is 64 QAM.

18. The method of claim 11, wherein the first modulation scheme is QPSK (Quadrature Phase Shift Keying) and the second modulation scheme is 16 QAM.

19. A processing node for inter band carrier aggregation, the processing node being configured to perform operations comprising:
   determining a spectral efficiency based on data transmitted between an access node and a plurality of wireless devices;
   comparing the spectral efficiency with a predetermined efficiency threshold;
   when the spectral efficiency is equal to or lower than the predetermined efficiency threshold, determining whether a wireless device operating on a first frequency band using a first modulation scheme is located within an overlapping area between a first coverage area of the first modulation scheme on the first frequency band and a second coverage area of a second modulation scheme on a second frequency band; and
   when the wireless device is located within the overlapping area, performing an inter band carrier aggregation between the first frequency band and the second frequency band for the wireless device, wherein determining whether the wireless device operating on the first frequency band is located within the overlapping area comprises:
   determining a location of the wireless device; and
   comparing the location of the wireless device with predetermined map data of the overlapping area or with predetermined map data of the second coverage area to determine whether the wireless device is located within the overlapping area.

20. The processing node of claim 19, wherein the first frequency band is higher than the second frequency band.

* * * * *